3,179,540
FLUX FOR SOLDERING AND LOW-TEMPERATURE SOLDERING-WELDING OF CAST IRON BY BRASS SOLDERS

Gnesja Abramovna Asinovskaja, Metrostrojevskaja St. 3/14, Apt. 44; Boris Mikhailovich Dmitriev, Parkovaja St. 4, Apt. 46; and Andrey Nickolaevich Shashkov, Lomonosovsky Prospekt 23, Apt. 550, all of Moscow, U.S.S.R.
No Drawing. Filed May 21, 1963, Ser. No. 282,107
1 Claim. (Cl. 148—26)

The present invention applies to fluxes intended for soldering and low-temperature soldering-welding of grey cast iron by brass solders.

It is well known that soldering of cast iron using common fluxes containing boric acid and sodium carbonate do not ensure proper wettability of cast iron (wetting with flux) as the flux possesses a relatively low surface activity at low temperatures.

Attempts were made to perform welding and soldering of cast iron at high temperatures when wettability of cast iron increases. As it is known, however, chilling of cast iron occurs here, that is, appearance of hard structures of metal and cracks.

Ways of silver soldering of cast iron at low temperatures were proposed but silver solders are scarce and expensive.

Though attempts were made to overcome the above and other difficulties, no one of them, as we know, has made a success by using low-temperature soldering and welding of cast iron for commercial purposes on an industrial scale.

It was established that the problem of low-temperature soldering and welding of cast iron had been successfully solved by using a new kind of flux possessing a high surface activity at low temperatures and good wettability of cast iron.

In the broad sense, this invention is intended to ensure low-temperature soldering and welding of cast iron in the case of solid joints of cast iron articles and patching of casting defects.

The object of this invention is to ensure soldering and welding by brass solders without any chilling phenomena of cast iron.

This invention is also intended to ensure soldering and low-temperature welding of cast iron without cracking.

Furthermore, the aim of this invention is to obtain such welded and soldered joints which lend themselves to cutting.

In accordance with the above and other objects this invention embodies a new flux composition which is here and below described in the claim of patenting. It is clear that some variations may take place within the scope of the invention to be patented without any deviations from the idea of this invention.

The other purposes and advantages of this invention will become clear from the following detailed description.

There is proposed a flux containing boric acid and sodium carbonate into which lithium carbonate ($Li_2CO_3$) of 20–25% is introduced.

The other components are taken in the following proportions: boric acid ($H_3BO_3$)—50–60% sodium carbonate ($Na_2CO_3$)—20–25%.

The proposed flux possesses high surface activity and permits one to carry on the process of soldering and welding of cast iron at 700–750° C. without preliminary burning out of graphite. Lack of structural conversions in the area of heating and preservation of the initial properties of metal are considered as an advantage of low-temperature soldering-welding by brass solders. Here the internal stresses and, hence, the possibility of cracking are decreased.

In order to flux oxides obtained as a result of melting brass solders, boric acid ($H_3BO_3$) is introduced into the flux composition.

Since silicon oxides $SiO_2$ are formed on the surface of cast iron, basic salt-sodium carbonate $Na_2CO_3$ is introduced into the flux composition along with acid salts, to which boric acid applies, for slagging the oxides.

Negative influence of graphite on wettability (with the solder) of the surface of cast iron is compensated by the presence of lithium carbonate $Li_2CO_3$ in the flux composition which at a certain ratio to sodium carbonate, e.g., 1:1, reduces the melting temperature of the flux and considerably increases its surface activity.

The following optimum flux composition is recommended:

| | Percent |
|---|---|
| Boric acid ($H_3BO_3$) | 50–60 |
| Lithium carbonate ($Li_2CO_3$) | 20–25 |
| Sodium carbonate ($Na_2CO_3$) | 20–25 |

The flux is prepared by way of melting its components.

The proposed flux possesses good technological properties. The range of working temperature of fluxation amounts to 600–650° C. The joint weld ensures high indices of strength and plasticity.

Thereby a thoroughly welded caulking joint without non-metallic inclusions is ensured. The strength of the weld approximates to the strength of the basic metal.

Although this invention is intended for the preferable kind of realization, it is clear that changes and variations may take place without any deviations from the idea and scope of this invention. This, of course, will be quite clear for specialists of this field.

These changes and variations are not considered to be beyond the main point and scope of the invention and claim of patenting.

What we claim is:

Flux for soldering and low-temperature soldering-welding of cast iron by brass solders consisting essentially of boric acid ($H_3BO_3$)—50–60%; lithium carbonate ($Li_2CO_3$)—20–25%; and sodium carbonate ($Na_2CO_3$)—20–25%, said constituents constituting substantially 100% of said flux composition.

References Cited by the Examiner
UNITED STATES PATENTS 2,504,802  4/50  Christ et al. _____ 148—26

DAVID L. RECK, *Primary Examiner.*
WINSTON A. DOUGLAS, *Examiner.*